US006952502B2

(12) United States Patent
Gil et al.

(10) Patent No.: US 6,952,502 B2
(45) Date of Patent: Oct. 4, 2005

(54) DATA FILTERING APPARATUS AND METHOD

(75) Inventors: Joseph Gil, Haifa (IL); Ron Kimmel, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 604 days.

(21) Appl. No.: 09/887,566

(22) Filed: Jun. 25, 2001

(65) Prior Publication Data

US 2002/0150305 A1 Oct. 17, 2002

Related U.S. Application Data

(60) Provisional application No. 60/213,583, filed on Jun. 23, 2000.

(51) Int. Cl.[7] ............................ G06K 9/42; G06K 9/56

(52) U.S. Cl. ....................................... 382/257; 382/308

(58) Field of Search ................................ 382/173, 218, 382/257, 260, 266, 308; 607/9

(56) References Cited

U.S. PATENT DOCUMENTS 4,866,785 A * 9/1989 Shibano ...................... 382/257
5,817,133 A * 10/1998 Houben ......................... 607/9
5,937,111 A * 8/1999 Yamada ...................... 382/308
5,953,461 A * 9/1999 Yamada ...................... 382/266
5,987,192 A * 11/1999 Maltsev et al. ............. 382/298
6,192,160 B1 * 2/2001 Sunwoo et al. ............. 382/257

* cited by examiner

*Primary Examiner*—Kanjibhai Patel

(57) ABSTRACT

Data filtering apparatus comprising: an input for receiving a stream of data, each data item taking a range of at least two values ranging between a low value to a high value, a segmentation device for dividing the stream into segments, a segment midpoint definer for defining a midpoint of each segment, a segment orderer for ordering the segment in a first direction from low to high on a first side of the midpoint and in a second direction from low to high on a second side of the midpoint, an extremity filter unit for comparing the ordered data on either side of the midpoint to create a temporary output per segment, for each segment, each data item on either side of the midpoint being given an extremity filter value, the filter unit being operable to utilize the ordering to find the extremity value via a minimal number of comparisons, the extremity filter for initially comparing a single end of each segment, and being operable to alternate between ends per segment, the extremity filter being further operable to compute remaining ends via comparisons of the middles of presently un-compared ends to the middle of the compared ends, and to conditionally copy a half of the compared end onto the un-compared end.

31 Claims, 3 Drawing Sheets

DATA FILTERING APPARATUS AND METHOD

RELATIONSHIP TO EXISTING APPLICATIONS

The present application claims priority from U.S. Provisional Patent Application No. 60/213,583 filed on Jun. 23, 2000.

FIELD OF INVENTION

The present invention relates to data filtering and mathematical morphology, and more particularly, but not exclusively to mathematical morphology of image processing, specifically using filters such as dilation and erosion, opening and closing filters.

BACKGROUND OF THE INVENTION

Dilation and erosion of images are operations commonly used in image analysis. Both of these operations depend on finding the maximum, or minimum, value of an input and assigning that value (the maximum or minimum value) to the output of the dilation or erosion within a pre-specified range.

Data input is received, and with that input is created a dilated, or eroded output. The dilated image is defined by assigning to each input datum the largest value of the data within a specified range. The eroded image is defined by assigning to each input datum the smallest value of the data within a specified range. For example, in applying a dilation of 8 to a specific image, the output is obtained by applying to each pixel the largest value of the 8 pixels in front of it. This may be expressed as:

for any given pixel Y, let Y have the value of the maximum value of the selected from the group consisting of, Y, Y+1, Y+2, Y+3, Y+4, Y+5, Y+6, Y+7, or simply:

$$y_i = \max_{\max\ 0 \le j < p} x_{i+j}$$

where $y_i$ is the output unit being dealt, $x_i$ is the input corresponding to the output datum $y_i$, p is the specified number of data inputs, in this case 8, and j is all the values from 0 to p−1. Erosion is essentially the same as dilation, the only difference being that for erosion max is replaced by min.

A challenge is to find all the values of y, in the efficient manner. It is possible to obtain all the values for y with p comparisons per datum. One goes through all the datum and compares each datum with each of the p data in front of it, and for the output, uses the largest of those comparisons.

The Gil-Warner van Herk algorithm is a way to process the min and max values of a given input regardless of the value of p. There are 3 steps to the Gil-Werman van Herk Algorithm (hereafter referred to as GWVH):

1. Partitioning the data into overlapping segments of size 2p−1
2. Creating values $R_k$ and $S_k$ per datum per segment
3. Merging the $R_k$ and $S_k$ values to obtain the largest value per datum Partitioning the data:

The incoming data is partitioned into overlapping segments of size 2p−1, each segment centered at $X_{p-1}$, $X_{2p-1}$, $X_{3p-1}$ . . . ,. For example, if the incoming data consists of 41 data, and p is set to be 5, each segment is 9 data long (2*5)−1), and they would be centered at $X_4$, $X_9$, $X_{14}$, $X_{19}$, $X_{24}$, $X_{29}$, $X_{34}$ and $X_{39}$. That is to say, segment 1 starts at $X_0$ and ranges through $X_8$. Segment 2 starts at $X_5$ and ranges through $X_{13}$. Segment 3 starts at $X_{10}$ and ranges through $X_{18}$. Segment 4 starts at $X_{15}$ and ranges through $x_{23}$. Segment 5 starts at $X_{20}$ and ranges through $X_{28}$. Segment 6 starts at $X_{25}$ and ranges through $X_{33}$. Segment 7 starts at $X_{30}$ and ranges through $X_{38}$. Segment 8 starts at $X_{35}$ and ranges through $X_{40}$.

Creating values $R_k$ and $S_k$ per datum per segment:

The GWVH algorithm starts at the center of each segment, and gives the center segment the $R_k$ and $S_k$ (in this case, $R_0$ and $S_0$, as the center k=0) of that segment. IE. Each center segment's $R_k$ and $S_k$ values are the values of that segment. Each datum is then given an $R_k$ and $S_k$ value as follows:

The $R_k$ values:

for each value of k (Where k goes from 0 to p−1) the GWVH algorithm compares the value of the current Datum with the value of $R_{k-1}$ for that segment, and assigns $R_k$ for the current datum to the larger of those two.

For example in the above case (41 datum numbered 0 . . . 40, p=5) looking at the third segment:

k=0. The GWVH algorithm assigns $R_k$ (in this instance $R_0$, as k=0) for 14 to whatever 14 is (14 is the center of the third segment).

k=1. Then, the GWVH algorithm looks at datum 13, and compares the value of datum 13 to the value of $R_{k-1}$ for that segment (in this case $R_0$ of the third segment) and assigns $R_k$ for the current datum (In this case, $R_1$ of the third segment) to the greater of the 2 values.

k=2, Then, the GWVH algorithm looks at datum 12, and compares the value of datum 12 to the value of $R_{k-1}$ for the segment (in this case, $R_1$ of the third segment) and assigns $R_k$ for the current datum (In this case, $R_2$ of the third segment) to the greater of the 2 values.

k=3, Then, the GWVH algorithm looks at datum 11, and compares the value of datum 11 to the value of $R_{k-1}$ for that segment (in this case, $R_2$ of the third segment) and assigns $R_k$ for the current datum (In this case, $R_3$ of the third segment) to the greater of the 2 values.

k=4, Then, the GWVH algorithm looks at datum 10, and compares the value of datum 10 to the value of $R_{k-1}$ for that segment (in this case $R_3$ of the third segment) and assigns $R_k$ for the current datum (In this case, $R_4$ of the third segment) to the greater of the 2 values.

or, expressed more simply:

$$R_k = \max(X_j, X_{j-1}, \ldots, X_{j-k})$$

where $X_j$ is the center of each segment and k=0, . . . p−1.

The $S_k$ values:

The $S_k$ are computed the same way as the $R_k$ values, except that as k increases you look at the higher values of datum, so in the third segment $S_k$ where k=0 is still the value of datum 14, but $S_k$ when k is one is the larger of datum 14, and datum 15. The equation for $S_k$ is:

$$S_k = \max(X_j, X_{j+1}, \ldots, X_{j+k}).$$

Having generated an $R_k$ and $S_k$ for each datum, the GWVH algorithm proceeds to merge various $R_k$ and $S_k$ values to fine the max filter as follows:

The original definition for the max filter looks like:

$$y_i = \max_{\max 0 \le j < p} x_{i+j}$$

The algorithm substitutes max($X_{j-k}$, $X_{j-(k-1)}$, . . . $X_j$, $X_{j+1}$, . . . , $X_{j-p-k-1}$) for $$\max_{\max 0 \le j < p} x_{i+j}.$$

Considering the above substitution, $$\max_{\max 0 \le j < p} x_{i+j}$$

implies taking the largest value of any given X, from $X_i$ through $X_{i+p-1}$. Considering the substitution max($X_{j-k}$, $X_{j-(k-1)}$, . . . $X_j$, $X_{j+1}$, . . . , $X_{j+p-k-1}$), start at $X_{j-k}$ for arbitrary values of j and k. The algorithm is required find the max value from $X_{j-k}$ through $X_{j-k+p-1}$, which is in fact what has been done. Having defined $R_k$ and $S_k$ over all the different segments, the algorithm must determine max($X_{j-k}$, $X_{j-(k-1)}$, . . . $X_j$, $X_{j+1}$, . . . , $X_{j+p-k-1}$) for a given j, and a given k. Having determined that the $R_k$ between a current datum and the next center datum is the largest value between the current datum and the next center datum, the algorithm need no longer compare the current datum with any data other than the $R_k$ of this datum until the next center datum. From the next center datum on, the $S_k$'s remain the same or increase (are monotonically increasing), so to find the largest value from the next mid datum on, the GWVH algorithm chooses the correct $S_k$ of the current segment, which is the datum p−1 away from the current datum, namely the datum $S_{p-k-1}$ of this segment, remembering that for any given segment $S_0$ is the mid datum, therefore $S_p$ is p away from the mid datum. The definition requires the output for any given datum to be the largest of itself and the p−1 data is front of it. The algorithm need not compare a datum p away, as it requires the largest of the current datum, and all the datum p−1 from it. Using the above definition the current datum is k behind the next mid datum, where k may be 0, so the algorithm uses the datum that is p−k−1 past the mid datum of the section that the current datum has an $R_k$ value of, thus value of datum $S_{p-k-1}$. Once the GWVH algorithm has determined the $R_k$ and $S_k$, there is one comparison to do to find the max value for any given datum, namely:

$$\begin{aligned} y_i &= \max_{\max 0 \le j < p} x_{i+j} \\ &= \max(x_{j=k}, x_{j-k+1}, \ldots x_j, x_{j+1}, \ldots x_{j+p-k-1}) \\ &= \max(R_k, s_{p-k-1}). \end{aligned}$$

The GWVH algorithm does 1 comparison per datum for each $R_k$ and one comparison for each $S_k$. It then does one comparison for to determine the max over p for any given datum, giving a total of 3 comparisons per datum, regardless of the size of p. It should be noted that for the cases of k=0, and k=p−1 there is not need to do a comparison, one can simply choose the appropriate $R_k$ or $S_k$, (k=0, $S_k$, k=p−1, $R_k$), without having to do the comparison.

In image analysis, it is often useful to take the opening, or the closing filter, that is, for the opening filter, filtering the data through a max filter, and then taking the output of the data, and running it through a min filter, or, for the closing filter, taking the data and running it through a min filter, and then taking the data and running it through a max filter. The above algorithm takes approximate 6 comparisons per data datum. Image analysis can be expensive in terms of computer time, and it is useful to find ways of shortening the amount of processing needed to do any given operation.

SUMMARY OF THE INVENTION

According to the first aspect of the present invention, there is thus provided a device capable of efficiently computing morphological min and max, opening and closing filters.

According to a first aspect of the present invention there is provided data filtering apparatus comprising:

an input for receiving a stream of data, each data item taking a range of at least two values ranging between a low value to a high value, a segmentation device for dividing said stream into segments, a segment midpoint definer for defining a midpoint of each segment, a segment orderer for ordering said segment in a first direction from low to high on a first side of said midpoint and in a second direction from low to high on a second side of said midpoint, an extremity filter unit for comparing said ordered data on either side of said midpoint to create a temporary output per segment, for each segment, each data item on either side of said midpoint being given an extremity filter value, said filter unit being operable to utilize said ordering to said extremity value via a minimal number of comparisons, said extremity filter for initially comparing a single end of each segment, and being operable to alternate between ends per segment, said extremity filter being further operable to compute remaining ends via comparisons of the middles of presently un-compared ends to the middle of the compared ends, and to conditionally copy a half of the compared end onto the un-compared end.

Preferably, said extremity filter further is operable to copy the compared end of the previous segment.

Preferably, said extremity filter is operable to copy the compared end of the subsequent segment.

Preferably, said segment orderer is connected to receive segmented data, and to re-write the data in each segment such that the data is monotonically increasing from the center of each segment forward, and from the back of the segment monotonically decreasing to the center of the segment.

Preferably, segment orderer is connected to receive segmented data, and to re-write the data in each segment such that the data is monotonically decreasing from the center of each segment forward, and from the back of the segment monotonically increasing to the center of the segment.

Preferably, said extremity filter is a maximal filter, and said extremity value is a maximal value.

Alternatively, said extremity filter is a minimal filter, and said extremity value is a minimal value.

Preferably, said segment has an increasing part and a decreasing part, said extremity filter being operable to compare the value of the middle of the decreasing segment with the value at a corresponding position in the increasing segment, and further comprises a value copier for copying data values between a front half of the increasing segment and a front half of the decreasing segment, the value copier being set to copy the data values from the front half of the increasing segment onto the front half of the decreasing segment when the compared value in the front segment is larger, and otherwise to copy the data values from the back half of the back segment into the back half of the front segment.

The apparatus may additionally define new segments repeatedly and copying parts of each segment, until an end of said input data is reached.

Preferably, said segment has an increasing part and a decreasing part, said extremity filter being operable to start with an increasing part of the segment, compare a middle value of the decreasing segment part with a correspondingly positioned value of the increasing segment part, said extremity filter comprising a value copier set to copy the data values from the front half of the decreasing segment onto the front half of the back segment when the compared value of the increasing segment part is smaller, and to copy the data value from the back half of the back segment when the compared value of the increasing segment part is larger.

The apparatus may additionally define new segments repeatedly and copying parts of each segment, until the data end is reached.

According to a further aspect of the present invention there is provided an apparatus for filtering data, comprising:

an input for receiving a series of data values ranged between a low extremity and a high extremity, said data values being in segments ordered such that the data is monotonically increasing in a first direction from the midpoint and monotonically decreasing in a second direction from the midpoint, a comparator being set to compare the middle value of the first half of each segment with the middle values of the second half of the respective segment, the comparator setting the copier to copy a respective value from the second segment onto the first segment in accordance with the comparison result.

Alternatively, in accordance with the comparison result, the apparatus is operable to compute the values of the first segment by comparing them to the corresponding values in the second segment.

Preferably, said data is image data.

Preferably, said values are intensity values.

Preferably, said data is digital data.

The apparatus may be, connected as a preprocessor for an edge-detection device.

According to further aspect of the present invention there is provided a method for data filtering capable of computing both minimal and maximal values per point of a given data input comprising:

comparing two successive data inputs to find a minimum and a maximum thereof, using the minimum in a minimal filter to produce a minimal filter output for said data, using the maximum in a maximal filter to produce a maximal filter output for said data.

According to a further aspect of the invention there is provided a method of extremity filtering of a stream of data items, each data item taking a value between a low extremity and a high extremity, the method comprising:

segmenting said data stream into segments of a predetermined length around a segmenting midpoint, ordering the data in the segment around the midpoint such that on each side of the midpoint, successive data items have values which change in only one direction between said low and said high extremity, the direction being opposite on each side of the midpoint, for each side of the midpoint, finding a middle data value, comparing said respective middle data values of said sector, and copying values from one side of said midpoint to the other in accordance with the result of the comparison.

According to a further aspect of the present invention there is provided a method capable of efficiently computing a maximum filter of a minimum filter comprising:

computing the minimum filter using data segmented according to a segmentation pattern, maintaining said data segmentation pattern of the minimum filter, passing the data segmentation pattern from the minimum filter to the maximum filter, the maximum filter using the data segmentation pattern to efficiently compute the segment values.

According to a further aspect of the present invention there is provided a method of efficiently computing a minimum filter of a maximum filter comprising:

computing the maximum filter using data segmented according to a segmentation pattern, maintaining said data segmentation pattern of the maximum filter, passing the data segmentation pattern from the maximum filter to the minimum filter, the minimum filter using the data segmentation pattern to efficiently compute the segment values.

Preferably, a result of said comparison is that a first middle data value of a first side of said segment is higher then a second middle data value of a second side of said segment, said method comprising copying data from said first side of said segment to said second side of said segment.

Alternatively, a result of said comparison is that a first middle data value of a first side of said segment is lower than a second middle data value of a second side of said segment, said method comprising copying data from said second side of said segment to said first side of said segment.

Preferably, the data is image data.

Preferably, the data is digital data.

Preferably, the values are intensity values.

Preferably, segmenting is carried out successively incrementally along said data stream.

Preferably, copying is arranged to provide edge enhancement within said data.

The embodiments may carry out maximal filtering or minimal filtering or, in a particularly preferred embodiment may concomitantly carry out maximal filtering and minimal filtering whilst sharing said comparison outputs.

BRIEF DESCRIPTION OF THE DRAWINGS

For a better understanding of the invention and to show how the same may be carried into effect, reference will now be made, purely by way of example to the accompanying drawings.

DESCRIPTION OF THE PREFERRED EMBODIMENTS

Figure 1:
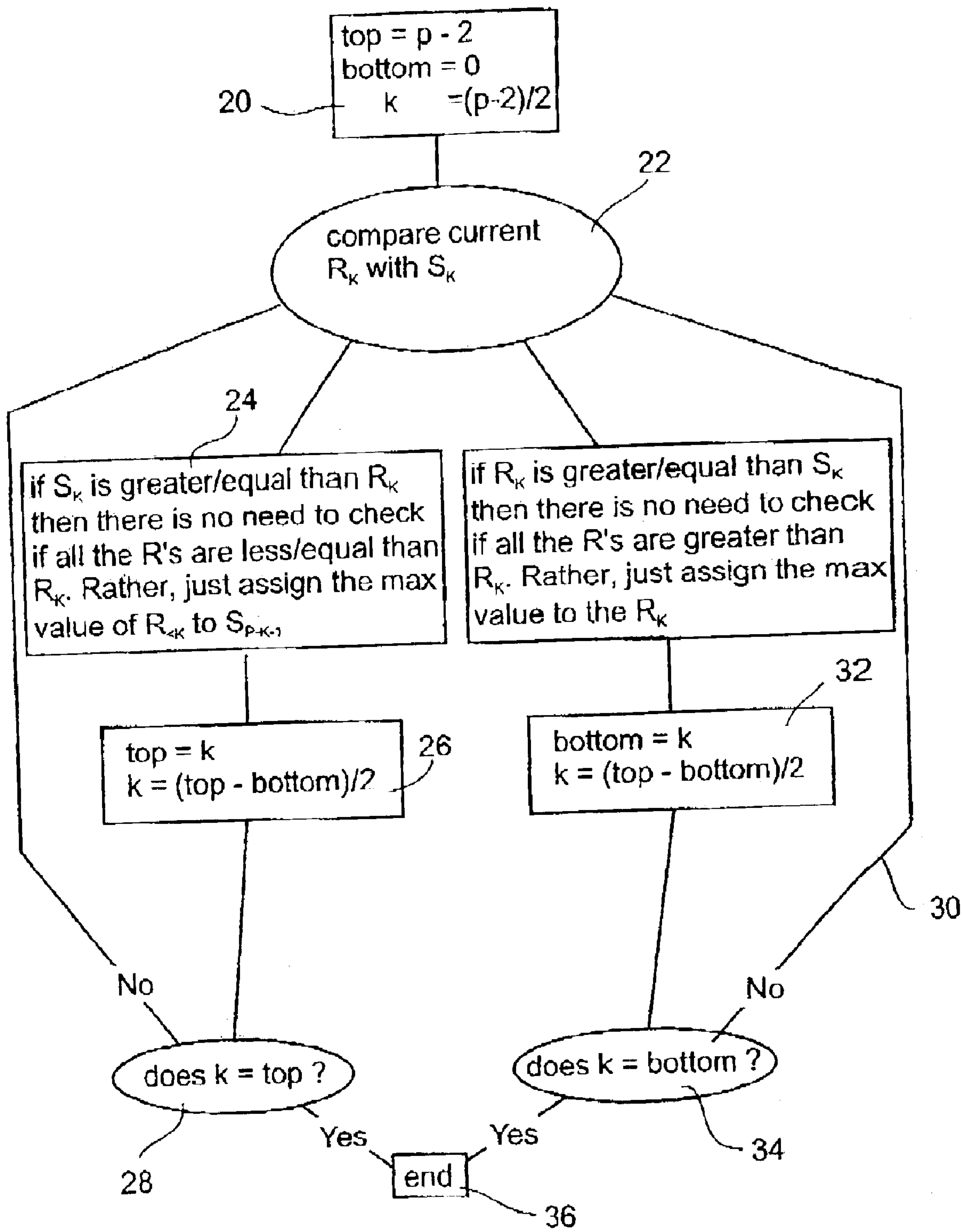
FIG. 1 is a simplifies flow chart showing a merge procedure that is more efficient than the GWVH merge procedure.

Before Describing at least one embodiment of the invention in detail, it is to be understood that the invention is not limited in its application to the details of construction and the arrangements of the components set forth in the following description or illustrated in the drawings. The invention is applicable to other embodiments or of being practiced or carried out in various ways. Also it is to be understood that the phraseology and terminology employed herein is for the purpose of description and should not be regarded as limiting.

Reference is now made to FIG. 1 which is a simplified flow chart of a first improvement to the GWVH algorithm. Using the notation introduced above recalling that we have segmented the data input into overlapping segments of 2p−1, where each segment has a center at $X_j$, and each datum has an R, and a S value, the R's increasing from $X_j$ backwards, the S's increasing from $X_j$ forwards, we may state:

$$R_{p-2} \geqq R_{p-3} \geqq \ldots \geqq R_1 \text{ and}$$

$$S_{p-2} \geqq S_{p-3} \geqq \ldots \geqq S_1.$$

An algorithm can eliminate most of the comparisons in the merge process, in the following manner. Suppose that for some specific i it was found that $$R_i \geqq S_{p-i-1}$$

then for all k>i, it may be assumed:

$$R_k \geqq R_i \geqq S_{p-i-1} \geqq S_{p-k-1}.$$

and therefore there is no need to do the merge comparisons for all k>i. Similarly if it is determined that $$R_i \geqq S_{p-i-1}.$$

then there is no need to do the comparisons for all k<i, Instead it is possible to simply assign all $R_i$, for i less then k to $S_i$.

The optimized procedure for doing the merge step is therefore a binary search. The improved GWVH algorithm may start begin making comparison at ((p−2)/2) 20, and then continues with the remaining half of the segment. If the $R_k$ is less then or equal to $S_k$, then the improved GWVH algorithm is able to determine that for all i<k, $R_i \leqq S_{p-i-1}$, thus the improved GWVH algorithm may assign the determined maximum (max) to $S_{p-i-1}$ 24. The improved GWVH algorithm then preferably searches through the remaining half of the problem 26. If the GWVH algorithm has completed the problem 28 it stops 36, otherwise, it continues 22. If the $R_k$ is greater then $S_k$, then the improved GWVH algorithm knows that for all i>k, $R_i \geqq S_{p-i-1}$, and the improved GWVH algorithm may therefore simply assign the maximum (max) to $R_i$ 24. The improved GWVH algorithm then searches through the remaining half of the problem 32. If the GWVH algorithm has completed the problem 34 it stops 36, otherwise it continues 22.

Figure 2:
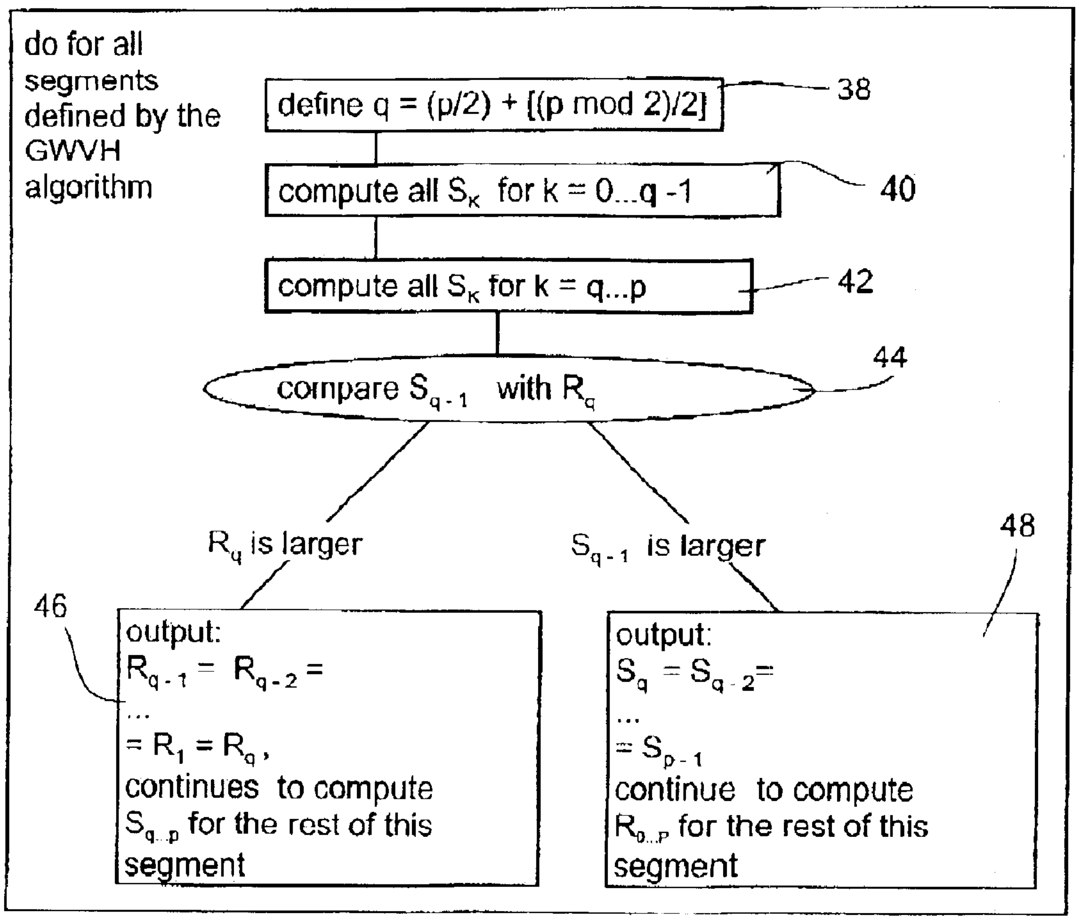
FIG. 2 is a simplified flow chart showing a pre-processing procedure that is more efficient than the pre-processing in the GWVH algorithm

Reference is now made to FIG. 2 which is simplified flow chart of a second improvement to the GWVH algorithm. The GWVH algorithm makes 2 comparisons per datum to solve the preprocessing, to get all the $R_k$ and $S_k$. It starts in the middle, and compares the next datum to the right, and the next datum to the left of the previous max. The GWVH algorithm preferably carries out such a comparison, at every datum, for every R, and S, giving a total of 2 comparisons per datum.

A variable q is defined

Let $q=(p/2)+[(p \bmod 2)/2]$ 38.

The first part of the improved GWVH implementation computes all the $S_k$ for k=0 . . . , q−1 40, and all the $r_k$ for k=q, . . . , p 42. This is carried out using p−1 comparisons, by assigning the next r, and s the greater of itself and the previous local max (in the same manner as the GWVH algorithm).

The second part of the modified implementation of the pre-processing stage begins by comparing $S_{q-1}$ with $\gamma_q$ 44. If $\gamma_q \geqq S_{q-1}$ then the improved GWVH algorithm knows that the overall maximum falls in one of $X_q, \ldots, X_p$. Therefore it is unnecessary to compute the value of $\gamma_{q-1}, \gamma_{q-2}, \ldots, r_1$, rather the improved GWVH algorithm outputs $\gamma_{q-1}=\gamma_{q-2}= \ldots =\gamma_1=\gamma_q$ and continues to compute $S_q, \ldots, S_{p-1}$ 46.

Similarly, if $\gamma_q \leqq S_{q-1}$ then the improved GWVH algorithm knows that the overall maximum falls in one of $X_0, \ldots, X_{q-1}$. Therefore it becomes unnecessary for the improved GWVH algorithm to compute the value of $S_q, \ldots, S_{p-1}$ rather the algorithm outputs $S_q=S_{q+1}= \ldots =S_{p-1}$, 48. In either case the improved GWVH algorithm requires (p/2)+[(p mod 2)/2]−1 comparisons, approximately 1.5 comparisons per datum, instead of 2 comparisons per datum.

Suppose the input data of a segment has its maximum located randomly in the segment, at location l. In the first part of the pre-processing stage, we maintain a record of the index $l_1$ at which the max value, the value stored at $S_i$, where i goes from 1, . . . , q−1 was found. It is likewise possible to keep a similar record of the index $l_2$ at which max value, the value stored at $r_i$, where i goes from p−1, . . . , q was found. Once the comparison between $S_{q-1}$ and $\gamma_q$ is made, the further improved GWVH algorithm knows if $l=l_1$ or if $l=l_2$ (if $S_1$ is larger, then $l=l_1$, otherwise, $l=l_2$). All that remains to be computed from the datum and on, is the outputs $S_q, S_{q+1}, \ldots, S_{l-1}$ in the case that $S_{q-1}<\gamma_q$, or otherwise $\gamma_{q-1}, \gamma_{q-2}, \ldots, r_{l+1}$. The expected number of comparisons in this second stage is $$\leq \frac{p}{4}.$$

In general it cannot be assumed that arbitrary input to the preprocessing will have it's maximum value at a random location, but the further improved GWVH algorithm can achieve such an effect by choosing a random starting datum for the start of the segmentation. The random selection of a starting point does not degrade overall efficiency, due in the case that p<<n (that the size of the window, the structuring element is significantly smaller that the total input size), as there need only be one random number generated for the entire input, which can be used for all segments. It should be noted that in general there is no need to actually pick a random starting point for the additional benefit, as most natural images are in large part random.

It is possible to compute the min and max of a give input more efficiently then computing both the min and max filter independently. Assume the algorithm is given a data input sequence $X_0, \ldots, X_n$. Compare the elements $X_0$ and $X_1$. The larger of the 2 becomes the running max hereafter referred to as $M_i$ and the smaller of the two becomes the running min hereafter referred to as $m_i$. To compute $M_{i+1}$ and $m_{i+1}$ compare $X_{i+1}$, and $X_{i+2}$ with each other. Compare $M_i$ with the larger of the two. Compare $m_i$ with the small of the two. At this stage, the algorithm has determined both $M_{1+2}$ and $m_{i+2}$, specifically $M_{i+2}$=max($M_i$, the larger of $X_{i+1}$, and $X_{i+2}$) and $m_{i+2}$=min ($m_i$, the smaller of $X_{i+1}$, and $X_{i+2}$).

If there were no changes, $M_{1+2}=M_{i+1}=M_1$ and $m_{i+2}=m_{i+1}=m_1$.

If both changed, the algorithm outputs $M_{i+2}$=max($M_i$, the larger of $X_{i+1}$, and $X_{i+2}$)=$M_{i+1}$ if only the maximum changed the algorithm outputs $$M_{i+2}=M_{i+1}=\max(M_i, \text{ the larger of } X_{i+1}, \text{ and } Xi+2)m_{i+2}=m_{i+1}=m_i$$

if the minimum changed the algorithm has to do an additional comparison to determine what $m_{i+1}$ is the algorithm outputs $M_{i+2}=M_{i+1}=M_i$, and $m_{i+2}$=min($m_i$, the smaller of $X_{i+1}$, and $X_{i+2}$)

and compares $m_i$ with min($X_{i+1}$, $X_{i+2}$), if min($X_{i+1}$, $X_{i+2}$) is smaller than $m_i$ the algorithm outputs, $m_{i+1}$=min($X_{i+1}$, $X_{i+2}$), otherwise the algorithm outputs $m_{i+1}=m_i$.

In the worst case the algorithm has to use 4 comparisons to find the largest and smallest values for each datum. Most cases will only require the first three comparisons, giving the algorithm an advantage over the obvious solution.

The further improved GWVH algorithm preferably uses the above result to obtain both the max and the min output for a given input stream. The further improved GWVH algorithm uses this improvement on the upper and bottom halves of the algorithm (computing the necessary $s_k$ and $r_k$ for both the min, and the max in this manner.

Figure 3:
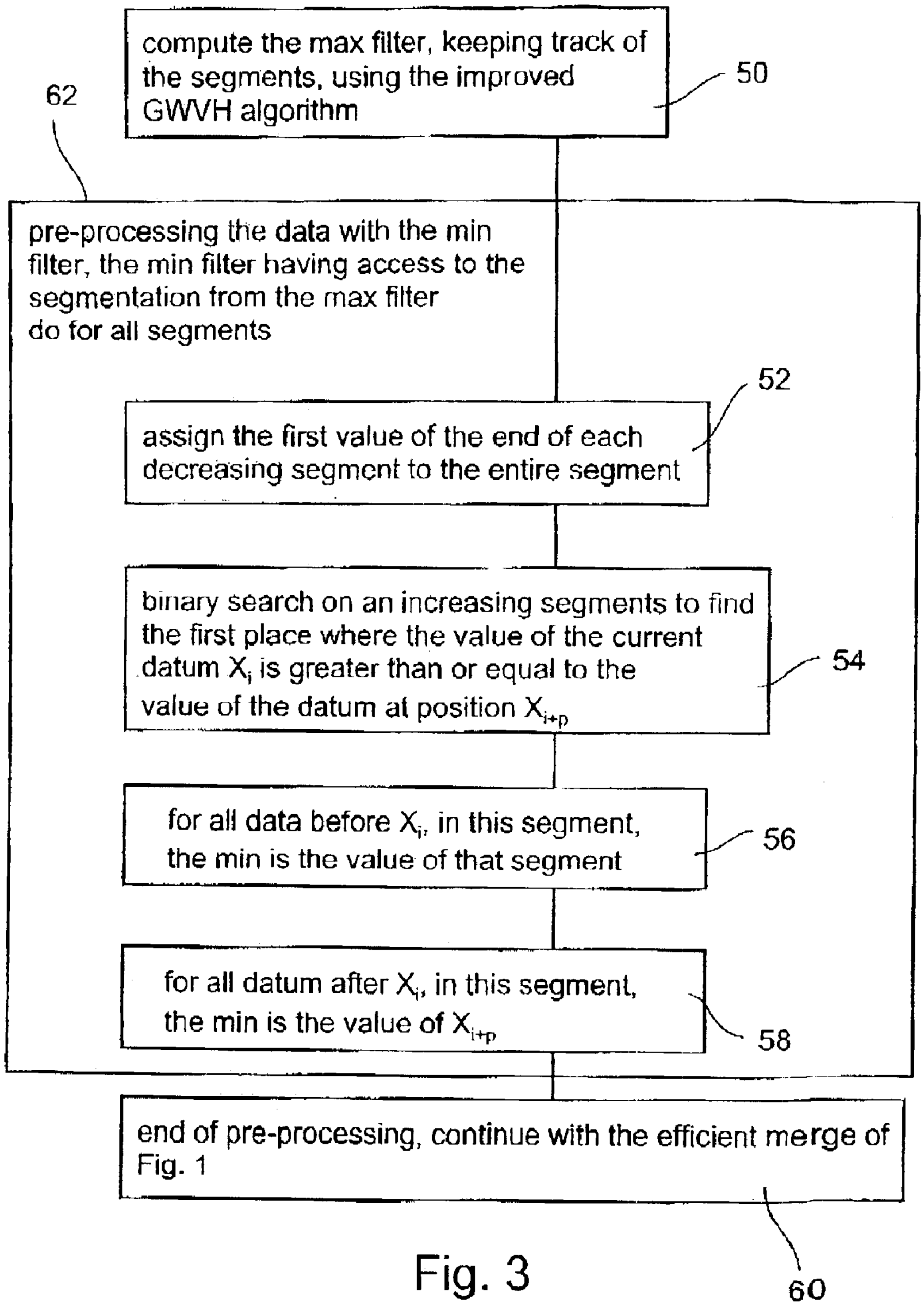
FIG. 3 is a simplified flow chart showing a opening filter that is more efficient than running a set of data through a max GWVH filter, and then a min GWVH filter

Reference is now made to FIG. 3 which is simplified flow chart of how to compute an opening or closing filter in an efficient manner, that is to say in a manner that is more efficient than a sequential application of the Max filter and the min filter, or the min Filter and the Max filter. The opening filter may be defined as the result of applying the max filter to an input stream, and then applying the min filter to the output of the max filter. The closing filter may be defined as the result of applying the min filter to an input, and then applying the max filter to the output of the min filter. The remainder of the description will only concern itself with the application of the opening filter, though it should be clear to one skilled in the art that the results for the opening filter are equally applicable for the closing filter.

Firstly the algorithm applies the further improved GWVH algorithm max filter as described above, while preserving the partitions of the output 50. The results are then fed into the further improved GWVH algorithm min filter 62. The min filter preferably has access to the partitions already made by the max filter. The partitioning information may then be used for an efficient implementation of the pre-processing stage. The algorithm preferably knows that all the segments are either increasing, or decreasing, and knows for each segment whether that segment is increasing or decreasing.

The efficient min filter for use with/in the opening filter with partitioning data preferably therefore:

1, Assigns the first value of the increasing segments to the entire preceding decreasing segment 52.

2. does a binary search on an increasing segment to find the first datum on the next decreasing segment that is within range p−1 that is smaller than or equal to the datum on the current increasing segment 54. For all data on the increasing segment before the first datum where the datum on the decreasing segment is within range p−1 and is smaller than the datum on the increasing segment, the min is the value of the datum on the increasing segment 56. On the first datum on the increasing segment before the first datum where the datum on the decreasing segment is within range p−1 and is smaller than the datum on the increasing segment, and after it, the pre-processing algorithm copies the data from the decreasing segment to the increasing segment 58.

Having efficiently pre-processed the data, the algorithm now goes on to efficiently merge the data as is seen in FIG. 1 60.

It is appreciated that certain features of the invention, which are, for the sake of clarity, described in the context of separate embodiments may also be provided in combination in a single embodiment. Conversely, various features of the invention which are, for brevity, described in the context of a single embodiment, may also be provided separately or in any suitable combination.

It will be appreciated by persons skilled in the art that the present invention is not limited to what has been particularly shown and described hereinabove. For instance, the descriptions given define data processing on a 1 dimensional data input. It should be clear that similar efficient processing may be done on an n-dimensional data input, where the data is analyzed first by rows, then columns then by the next dimension. Rather the scope of the present invention is defined by the appended claims and includes both combinations and sub-combinations of the various features described herein and above as well as variations and modifications thereof which would occur to persons skilled in the art upon reading the foregoing description.

What is claimed is:

1. Data filtering apparatus comprising:

an input for receiving a stream of data, each data item taking a range of at least two values ranging between a low value to a high value, a segmentation device for dividing said stream into segments, a segment midpoint definer for defining a midpoint of each segment, a segment orderer for ordering said segment in a first direction from low to high on a first side of said midpoint and in a second direction from low to high on a second side of said midpoint, an extremity filter unit for comparing said ordered data on either side of said midpoint to create a temporary output per segment, for each segment, each data item on either side of said midpoint being given an extremity filter value, said filter unit being operable to utilize said ordering to find said extremity value via a minimal number of comparisons, said extremity filter for initially comparing a single end of each segment, and being operable to alternate between ends per segment, said extremity filter being further operable to compute remaining ends via comparisons of the middles of presently un-compared ends to the middle of the compared ends, and to conditionally copy a half of the compared end onto the un-compared end.

2. Data filtering apparatus according to claim 1, said extremity filter further being operable to copy the compared end of the previous segment.

3. Data filtering apparatus according to claim 1, said extremity filter further being operable to copy the compared end of the subsequent segment.

4. Data filtering apparatus according to claim 1, said segment orderer being connected to receive segmented data, and to re-write the data in each segment such that the data is monotonically increasing from the center of each segment forward, and from the back of the segment monotonically decreasing to the center of the segment.

5. Data filtering apparatus according to claim 1, said segment orderer being connected to receive segmented data, and to re-write the data in each segment such that the data is monotonically decreasing from the center of each segment forward, and from the back of the segment monotonically increasing to the center of the segment.

6. Data filtering apparatus according to claim 1, said extremity filter being a maximal filter, and said extremity value being a maximal value.

7. Data filtering apparatus according to claim 1, said extremity filter being a minimal filter, and said extremity value being a minimal value.

8. Data filtering apparatus according to claim 6, said segment having an increasing part and a decreasing part, said extremity filter being operable to compare the value of the middle of the decreasing segment with the value at a corresponding position in the increasing segment, and further comprising a value copier for copying data values between a front half of the increasing segment and a front half of the decreasing segment, the value copier being set to copy the data values from the front half of the increasing segment onto the front half of the decreasing segment when the compared value in the front segment is larger, and otherwise to copy the data values from the back half of the back segment into the back half of the front segment.

9. Data filtering apparatus according to claim 8, the segmentation device being operable to define new segments repeatedly and copying parts of each segment, until an end of said input data is reached.

10. Data filtering apparatus according to claim 7, said segment having an increasing part and a decreasing part, said extremity filter being operable to start with an increasing part of the segment, comparing a middle value of the decreasing segment part with a correspondingly positioned value of the increasing segment part, said extremity filter comprising a value copier set to copy the data values from the front half of the decreasing segment onto the front half of the back segment when the compared value of the increasing segment part is smaller, and to copy the data value from the back half of the back segment when the compared value of the increasing segment part is larger.

11. Data filtering apparatus according to claim 10, the segmentation device being operable to define new segments repeatedly and copying parts of each segment, until the data end is reached.

12. Data filtering apparatus according to claim 1, said data being digital data.

13. Data filtering apparatus according to claim 1, connected as a preprocessor for an edge-detection device.

14. An apparatus for filtering data, comprising:

an input for receiving a series of data values ranged between a low extremity and a high extremity, said data values being in segments ordered such that the data is monotonically increasing in a first direction from the midpoint and monotonically decreasing in a second direction from the midpoint, a comparator being set to compare the middle value of the first half of each segment with the middle value of the second half of the respective segment, the comparator setting the copier to copy a respective value from the second segment onto the first segment in accordance with the comparison result.

15. Apparatus according to claim 14, wherein said comparator alternatively, in accordance with the comparison result being operable to compute the values of the first segment by comparing them to the corresponding values in the second segment.

16. Apparatus according to claim 14, wherein said data is image data.

17. Apparatus according to claim 16, wherein said values are intensity values.

18. A method for data filtering capable of computing both minimal and maximal values per point of a given data input comprising:

segmenting said data input;

comparing two successive data input segments to find a minimum and a maximum thereof, with said segmentation, using the minimum in a minimal filter to produce a minimal filter output for said data, and with said segmentation using the maximum in a maximal filter to produce a maximal filter output for said data.

19. A method of extremity filtering of a stream of data items, each data item taking a value between a low extremity and a high extremity, the method comprising:

segmenting said data stream into segments of a predetermined length around a segment midpoint, ordering the data in the segment around the midpoint such that on each side of the midpoint, successive data items have values which change in only one direction between said low and said high extremity, the direction being opposite on each side of the midpoint, for each side of the midpoint, finding a middle data value, comparing said respective middle data values of said segment, and copying values from one side of said midpoint to the other in accordance with the result of the comparison.

20. A method according to claim 19, wherein a result of said comparison is that a first middle data value of a first side of said segment is higher then a second middle data value of a second side of said segment, said method comprising copying data from said first side of said segment to said second side of said segment.

21. A method according to claim 20 comprising carrying out minimal filtering.

22. A method according to claim 19, wherein a result of said comparison is that a first middle data value of a first side of said segment is lower than a second middle data value of a second side of said segment, said method comprising copying data from said second side of said segment to said first side of said segment.

23. A method according to claim 22 comprising carrying out maximal filtering.

24. A method according to claim 19, said data being image data.

25. A method according to claim 24, said values being intensity values.

26. A method according to claim 19, said data being digital data.

27. A method according to claim 19, said segmenting being carried out successively incrementally along said data stream.

28. A method according to claim 27, said copying being arranged to provide edge enhancement within said data.

29. A method according to claim 19, comprising concomitantly carrying out maximal filtering and minimal filtering whilst sharing said comparison outputs.

30. A method capable of efficiently computing a maximum filter of a minimum filter comprising:

computing the minimum filter using data segmented according to a predetermined segmentation pattern, maintaining said data segmentation pattern of the minimum filter, passing the data segmentation pattern from the minimum filter to the maximum filter, the maximum filter using the predetermined data segmentation pattern to efficiently compute values for segments of said segmented data.

31. A method capable of efficiently computing a minimum filter of a maximum filter comprising:

computing the maximum filter using data segmented according to a predetermined segmentation pattern, maintaining said data segmentation pattern of the maximum filter, passing the data segmentation pattern from the maximum filter to the minimum filter, the minimum filter using the predetermined data segmentation pattern to efficiently compute values for segments of said segmented data.

* * * * *